(12) United States Patent
Chang et al.

(10) Patent No.: US 11,380,128 B2
(45) Date of Patent: Jul. 5, 2022

(54) APPARATUS INTEGRATED WITH FINGERPRINT RECOGNITION AND TOUCH DETECTION, AND METHOD OF CONTROLLING THE SAME

(71) Applicant: HIMAX TECHNOLOGIES LIMITED, Tainan (TW)

(72) Inventors: Yaw-Guang Chang, Tainan (TW); Jia-Ming He, Tainan (TW)

(73) Assignee: Himax Technologies Limited, Tainan (TW)

(*) Notice: Subject to any disclaimer, the term of this patent is extended or adjusted under 35 U.S.C. 154(b) by 0 days.

(21) Appl. No.: 16/907,301

(22) Filed: Jun. 21, 2020

(65) Prior Publication Data

US 2021/0271850 A1 Sep. 2, 2021

Related U.S. Application Data

(60) Provisional application No. 62/983,768, filed on Mar. 2, 2020.

(51) Int. Cl.
*G06V 40/12* (2022.01)
*G06F 3/044* (2006.01)
*G06V 40/13* (2022.01)

(52) U.S. Cl.
CPC .......... *G06V 40/1365* (2022.01); *G06F 3/044* (2013.01); *G06V 40/1306* (2022.01)

(58) Field of Classification Search
CPC .. G06K 9/00087; G06K 9/0002; G06F 3/044; G06F 3/041661; G06F 3/0446; G06V 40/1365; G06V 40/1306; G06V 40/67
See application file for complete search history.

(56) References Cited

U.S. PATENT DOCUMENTS

| | | | | |
|---|---|---|---|---|
| 2013/0321337 A1* | 12/2013 | Graham | .............. | G06F 3/03547 345/174 |
| 2015/0177884 A1* | 6/2015 | Han | ................... | G06F 3/04166 345/174 |
| 2016/0364593 A1* | 12/2016 | Lee | ...................... | G06F 3/04164 |
| 2017/0336909 A1* | 11/2017 | Song | ................... | G06K 9/0002 |
| 2018/0114047 A1* | 4/2018 | Kim | ................... | G06K 9/00026 |
| 2018/0181787 A1* | 6/2018 | Jee | ..................... | G06F 3/041661 |
| 2019/0034024 A1* | 1/2019 | Park | ................. | G06F 3/041661 |
| 2019/0042017 A1* | 2/2019 | Lu | ....................... | G06F 3/041661 |
| 2019/0129559 A1* | 5/2019 | Adams | .................. | G06F 1/1662 |
| 2020/0311367 A1* | 10/2020 | Hu | ........................ | G06F 3/0412 |
| 2021/0056333 A1* | 2/2021 | Cheng | .................. | G06K 9/0004 |

* cited by examiner

*Primary Examiner* — Premal R Patel
(74) *Attorney, Agent, or Firm* — CKC & Partners Co., LLC

(57) ABSTRACT

An apparatus integrated with fingerprint recognition and touch detection is provided. The apparatus includes a touchpad and a controller IC. The touchpad has a touch area for recognizing a touch event and a fingerprint area for recognizing a fingerprint and the touch event. The fingerprint area includes TX lines of a first group crossing RX lines of a first group. The touch area includes TX lines of the first group and a second group crossing RX lines of the first group and a second group. When the apparatus is operated in a fingerprint sensing mode, the controller IC supplies a driving signal to the TX lines of the first group. When the apparatus is operated in a touch sensing mode, the controller IC supplies the driving signal to the TX lines of the second group and a portion of the TX lines of the first group.

12 Claims, 4 Drawing Sheets

APPARATUS INTEGRATED WITH FINGERPRINT RECOGNITION AND TOUCH DETECTION, AND METHOD OF CONTROLLING THE SAME

RELATED APPLICATIONS

This application claims priority to U.S. Provisional Application Ser. No. 62/983,768, filed Mar. 2, 2020, which is herein incorporated by reference.

BACKGROUND

Field of Invention

The present invention relates to an apparatus integrated with fingerprint recognition and touch detection. More particularly, the present invention relates to an apparatus integrated with fingerprint recognition and touch detection, and a method of controlling the same.

Description of Related Art

Currently, secure computer systems, which require fingerprint authentication, utilize a separate pointer touchpad device for cursor control and a separate fingerprint recognition device for fingerprint authentication. Correspondingly, the use of two separate peripheral devices for two different functions (i.e., cursor control and fingerprint authentication) results in increased cost and complexity of operating a secure computer system. Correspondingly, as more and more computer systems are incorporating the use of separate fingerprint recognition devices, in order to provide for system security, the need to consolidate the fingerprint recognition devices into existing peripheral components grows as the demand for simplified single multi-functional devices increases.

SUMMARY

The present invention provides an apparatus integrated with fingerprint recognition and touch detection. The apparatus includes a touchpad and a controller integrated circuit (IC). The touchpad has a touch area for recognizing a touch event and a fingerprint area for recognizing a fingerprint and the touch event. The fingerprint area includes transmit (TX) lines of a first group crossing receive (RX) lines of a first group. The touch area includes TX lines of the first group and a second group crossing RX lines of the first group and a second group. When the apparatus is operated in a fingerprint sensing mode, the controller IC supplies a driving signal to the TX lines of the first group. When the apparatus is operated in a touch sensing mode, the controller IC supplies the driving signal to the TX lines of the second group and a portion of the TX lines of the first group.

In accordance with one or more embodiments of the invention, a distance between adjacent ones of the TX lines of the first group is smaller than a distance between adjacent ones of the TX lines of the second group. A distance between adjacent ones of the RX lines of the first group is smaller than a distance between adjacent ones of the RX lines of the second group.

In accordance with one or more embodiments of the invention, a distance between adjacent ones of the portion of the TX lines of the first group is the same as a distance between adjacent ones of the TX lines of the second group. A distance between adjacent ones of the portion of the RX lines of the first group is the same as a distance between adjacent ones of the RX lines of the second group.

In accordance with one or more embodiments of the invention, the apparatus is operated in the fingerprint sensing mode so as to recognize the fingerprint of a user, thereby determining authentication of the user. When the authentication of the user is determined, the apparatus is operated in the touch sensing mode so as to recognize the touch event.

In accordance with one or more embodiments of the invention, prior to operating in the fingerprint sensing mode, the apparatus is operated in the touch sensing mode so as to recognize a touch position, of the user, on the touchpad.

In accordance with one or more embodiments of the invention, the apparatus further includes a display screen. When the touch position is not within the fingerprint area, the display screen shows instruction to instruct the user to move a finger of the user to the fingerprint area.

The present invention further provides a method of controlling an apparatus integrated with fingerprint recognition and touch detection. The apparatus includes a touchpad having a touch area for recognizing a touch event and a fingerprint area for recognizing a fingerprint and the touch event. The fingerprint area includes transmit (TX) lines of a first group crossing receive (RX) lines of a first group. The touch area includes TX lines of the first group and a second group crossing RX lines of the first group and a second group. The method includes: supplying a driving signal to the TX lines of the first group in a fingerprint sensing mode; and supplying the driving signal to the TX lines of the second group and a portion of the TX lines of the first group in a touch sensing mode.

In accordance with one or more embodiments of the invention, a distance between adjacent ones of the TX lines of the first group is smaller than a distance between adjacent ones of the TX lines of the second group. A distance between adjacent ones of the RX lines of the first group is smaller than a distance between adjacent ones of the RX lines of the second group.

In accordance with one or more embodiments of the invention, a distance between adjacent ones of the portion of the TX lines of the first group is the same as a distance between adjacent ones of the TX lines of the second group. A distance between adjacent ones of the portion of the RX lines of the first group is the same as a distance between adjacent ones of the RX lines of the second group.

In accordance with one or more embodiments of the invention, the method further includes: operating in the fingerprint sensing mode so as to recognize the fingerprint of an user, thereby determining authentication of the user; and operating in the touch sensing mode so as to recognize the touch event when the authentication of the user is determined.

In accordance with one or more embodiments of the invention, the method further includes: prior to operating in the fingerprint sensing mode, operating in the touch sensing mode so as to recognize a touch position, of the user, on the touchpad.

In accordance with one or more embodiments of the invention, the method further includes: instructing the user to move a finger of the user to the fingerprint area when the touch position is not within the fingerprint area.

BRIEF DESCRIPTION OF THE DRAWINGS

The invention can be more fully understood by reading the following detailed description of the embodiment, with reference made to the accompanying drawings as follows.

DETAILED DESCRIPTION

Specific embodiments of the present invention are further described in detail below with reference to the accompanying drawings, however, the embodiments described are not intended to limit the present invention and it is not intended for the description of operation to limit the order of implementation. Moreover, any device with equivalent functions that is produced from a structure formed by a recombination of elements shall fall within the scope of the present invention. Additionally, the drawings are only illustrative and are not drawn to actual size. The using of "first", "second", "third", etc. in the specification should be understood for identify units or data described by the same terminology, but are not referred to particular order or sequence.

Figure 1:
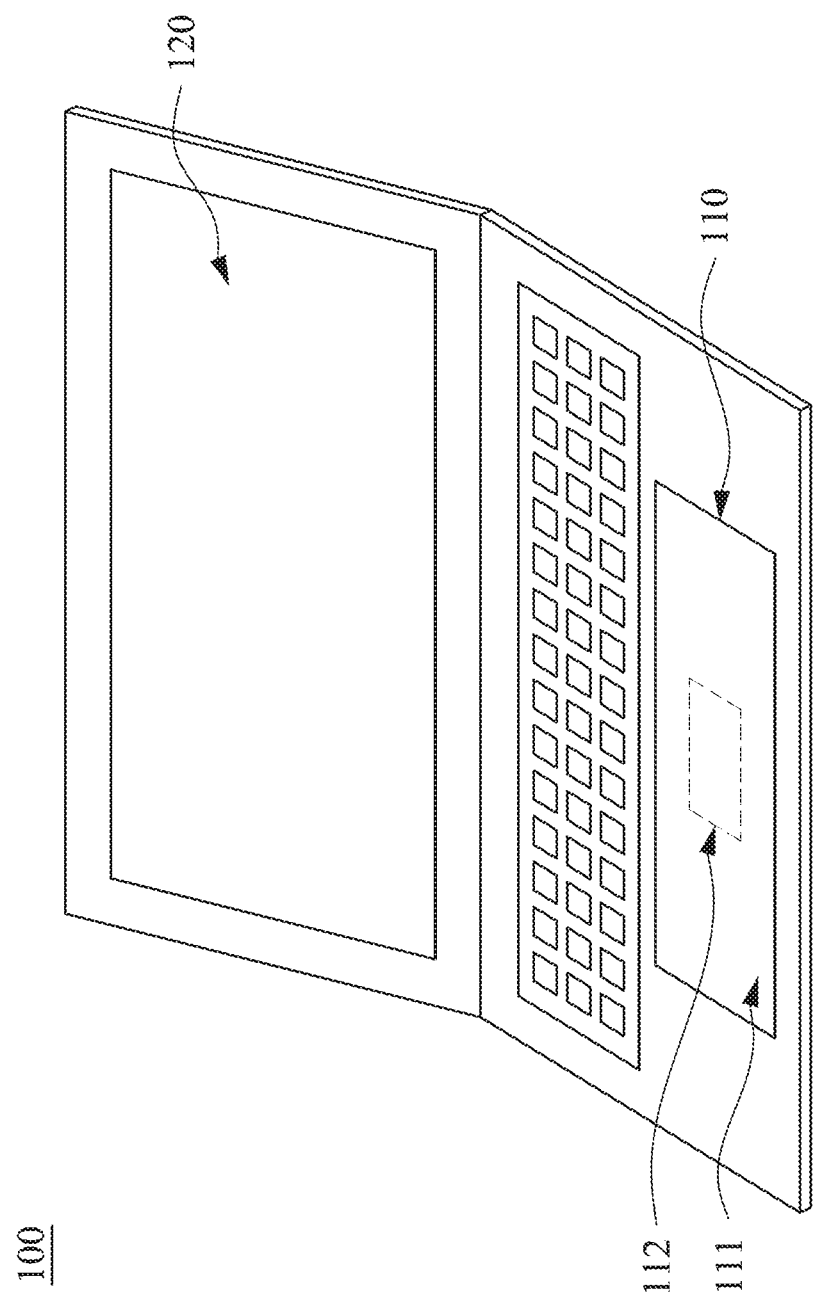
FIG. 1 illustrates a block diagram of apparatus integrated with fingerprint recognition and touch detection according to some embodiments of the present invention.

FIG. 1 illustrates a block diagram of apparatus 100 integrated with fingerprint recognition and touch detection according to some embodiments of the present invention. The apparatus 100 includes a touchpad 110 and a display screen 120. The touchpad 110 has a touch area 111 and a fingerprint area 112 distinct from the touch area 111. The touch area 111 is used for recognizing a touch event and a fingerprint area. The fingerprint area 112 is used for recognizing a fingerprint and the touch event. FIG. 1 shows that the fingerprint area 112 is located at the center of the touchpad 110, however, the present invention is not limited thereto, that is, the fingerprint area 112 can be located at any position of the touchpad 110.

Figure 2:
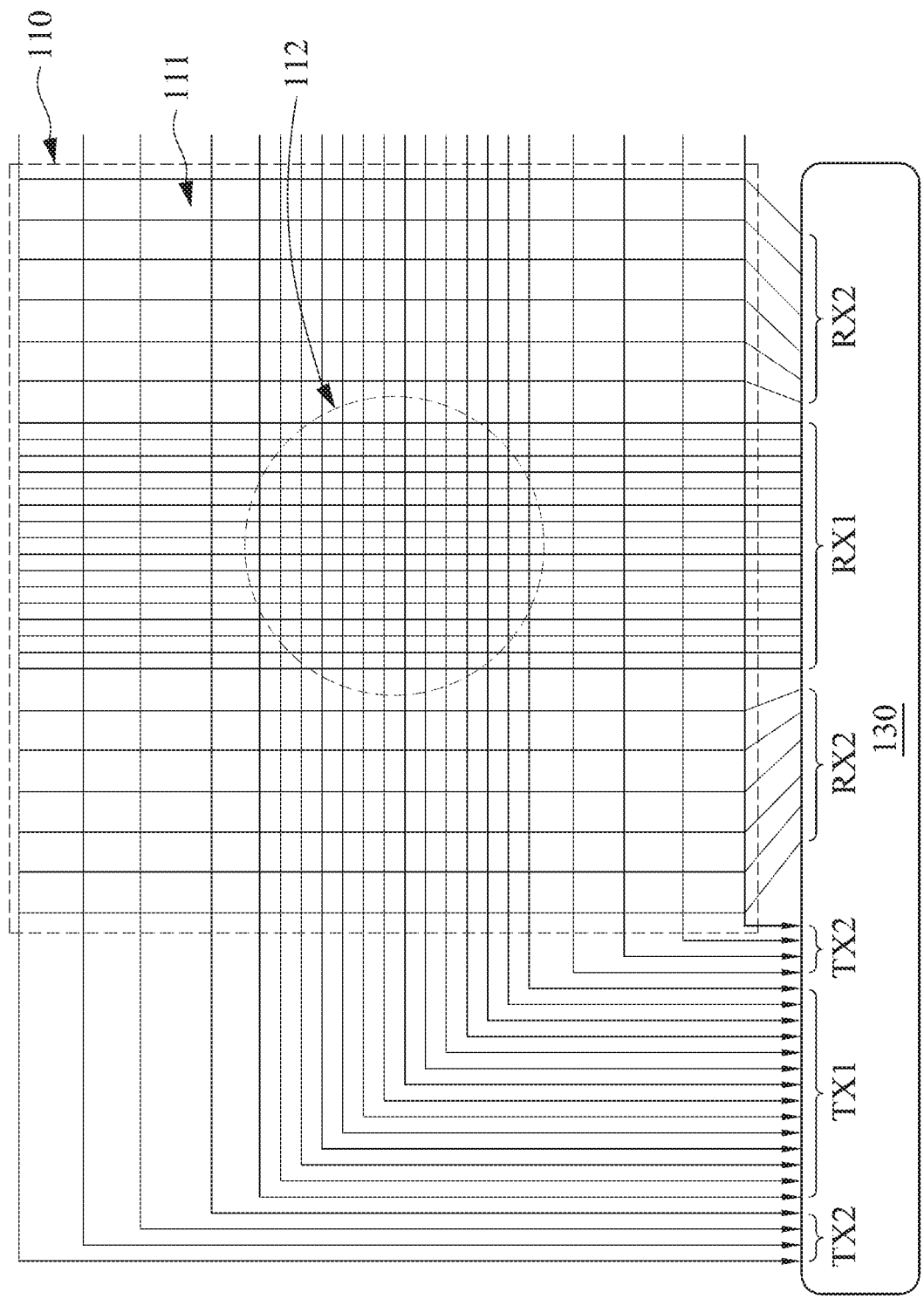
FIG. 2 illustrates a plan view of a layout of the touch area and the fingerprint area of the touchpad of the apparatus according to some embodiments of the present invention.

FIG. 2 illustrates a plan view of a layout of the touch area 111 and the fingerprint area 112 of the touchpad 110 of the apparatus 100 according to some embodiments of the present invention.

The fingerprint area 112 includes transmit (TX) lines TX1 of a first group which are arranged in parallel with one another in a vertical direction. The fingerprint area 112 further includes receive (RX) lines RX1 of a first group which are arranged in parallel with one another in a horizontal direction perpendicular to the vertical direction. The TX lines TX1 of the first group cross the RX lines RX1 of the first group.

The touch area 111 includes TX lines TX1 of the first group and TX lines TX2 of a second group which are arranged in parallel with one another in the vertical direction. The touch area 111 further includes RX lines RX1 of the first group and RX lines RX2 of a second group which are arranged in parallel with one another in the horizontal direction. The TX lines TX1 of the first group and the TX lines TX2 of the second group cross the RX lines RX1 of the first group and the RX lines RX2 of the second group.

The touchpad 110 includes a plurality of sensors (not shown), each having a capacitance. The capacitance may be divided into a self-capacitance and a mutual capacitance. The self-capacitance may be formed along a conductor line of a single layer formed in one direction, and the mutual capacitance may be formed between two conductor lines perpendicular to each other. The sensors are respectively formed at crossing of the TX lines TX1/TX2 and the RX lines RX1/RX2. It is noted that the number of the TX lines TX1/TX2, the number of the RX lines RX1/RX2, and the layout of the TX lines TX1/TX2 and the RX lines RX1/RX2 as shown in FIG. 2 are merely an example, and the present invention is not limited thereto.

The apparatus 100 further includes a controller integrated circuit (IC) 130. The controller IC 130 may supply a driving signal to the sensor through the TX lines TX1/TX2, supply charges to the sensor, and sense changes in capacitance of the sensor through the corresponding RX lines in synchronization with the driving signal, thereby sensing a touch input.

In some embodiments of the present invention, when the apparatus 100 is operated in a fingerprint sensing mode, the controller IC 130 supplies the driving signal to the TX lines TX1 of the first group, and senses a change in charges of the corresponding sensors input from the RX lines RX1 of the first group, and thus determines a fingerprint input, thereby sensing a fingerprint information.

In some embodiments of the present invention, when the apparatus 100 is operated in a touch sensing mode, the controller IC 130 supplies the driving signal to the TX lines TX2 of the second group and a portion of the TX lines TX1 of the first group, and senses a change in charges of the corresponding sensors input from the RX lines RX2 of the second group and a portion of the RX lines RX1 of the first group, and thus determines a touch input, thereby sensing a touch position.

As shown in FIG. 2, a distance between adjacent ones of the TX lines TX1 of the first group is smaller than a distance between adjacent ones of the TX lines TX2 of the second group, and a distance between adjacent ones of the RX lines RX1 of the first group is smaller than a distance between adjacent ones of the RX lines RX2 of the second group. In some embodiments of the present invention, the TX lines TX1 of the first group and the RX lines RX1 of the first group are used for recognizing the fingerprint, and thus the distance between adjacent ones of the TX lines TX1 of the first group and the distance between adjacent ones of the RX lines RX1 of the first group may be about 50 μm. In some embodiments of the present invention, the TX lines TX2 of the second group and the RX lines RX2 of the second group are used for recognizing the touch event as cursor control, and thus the distance between adjacent ones of the TX lines TX2 of the second group and the distance between adjacent ones of the RX lines RX2 of the second group may be about 1 mm to 5 mm.

Because the TX lines TX1 of the first group and the RX lines RX1 of the first group are formed as a high-density arrangement pattern, the corresponding sensors formed at crossing of the TX lines TX1 of the first group and the RX lines RX1 of the first group are minutely formed so that the corresponding sensors may be positioned between ridges and valleys of a fingerprint. Therefore, fingerprint recognition can be accurately performed. Furthermore, because touch event recognition does not require a definition as high as that of fingerprint recognition, the TX lines TX2 of the second group and the RX lines RX2 of the second group are formed as a low-density arrangement pattern. In addition, because touch event recognition does not require a definition as high as that of fingerprint recognition, the portion of the TX lines TX1 of the first group and the portion of the RX lines RX1 of the first group used for touch event recognition are selected from the TX lines TX1 of the first group and the RX lines RX1 of the first group, and the portion of the TX lines TX1 of the first group and the portion of the RX lines RX1 of the first group used for touch event recognition are selected as the low-density arrangement pattern, which is identical to the low-density arrangement pattern of the TX lines TX2 of the second group and the RX lines RX2 of the second group. In some embodiments of the present invention, a distance between adjacent ones of the portion of the TX lines TX1 of the first group is the same as a distance between adjacent ones of the TX lines TX2 of the second group, and a distance between adjacent ones of the portion of the RX lines RX1 of the first group is the same as a distance between adjacent ones of the RX lines RX2 of the second group.

It is worth mentioning that the widths and/or the patterns of the TX lines and/or the RX lines may be adjusted to enhance the amount of signal sensing by the corresponding sensor formed at crossing of the corresponding TX lines and the corresponding RX lines. For example, the widths of the TX lines and/or the RX lines may be increased to enhance the amount of signal sensing by the corresponding sensor formed at crossing of the corresponding TX lines and the corresponding RX lines. For example, the patterns of the TX lines and/or the RX lines may be adjusted (e.g., the branch pattern) to enhance the amount of signal sensing by the corresponding sensor formed at crossing of the corresponding TX lines and the corresponding RX lines.

Figure 3:
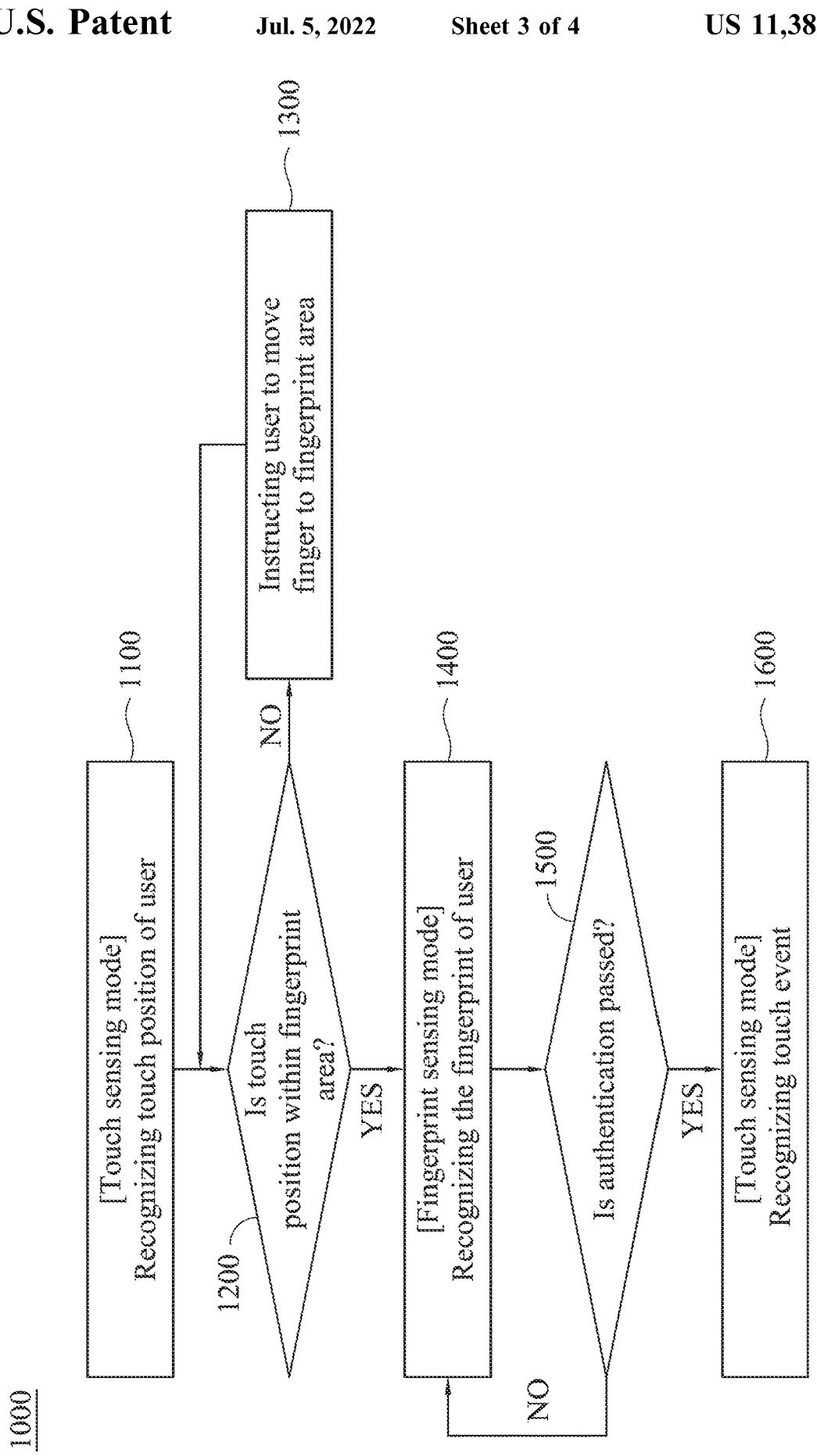
FIG. 3 illustrates a flow chart of a method of controlling the apparatus according to some embodiments of the present invention.

FIG. 3 illustrates a flow chart of a method 1000 of controlling the apparatus 100 according to some embodiments of the present invention. In step 1100 of the method 1000, when the apparatus 100 is powered on, the apparatus 100 is first operated in the touch sensing mode so as to recognize a touch position, of the user, on the touchpad 110 of the apparatus 100. Then, in step 1200, the apparatus 100 determines whether the touch position recognized in step 1100 is within the fingerprint area 112. When the touch position is determined to be not within the fingerprint area 112 (i.e., the touch position is within the touch area 111), the step 1300 is performed. When the touch position is determined to be within the fingerprint area 112, the step 1400 is performed.

Figure 4:
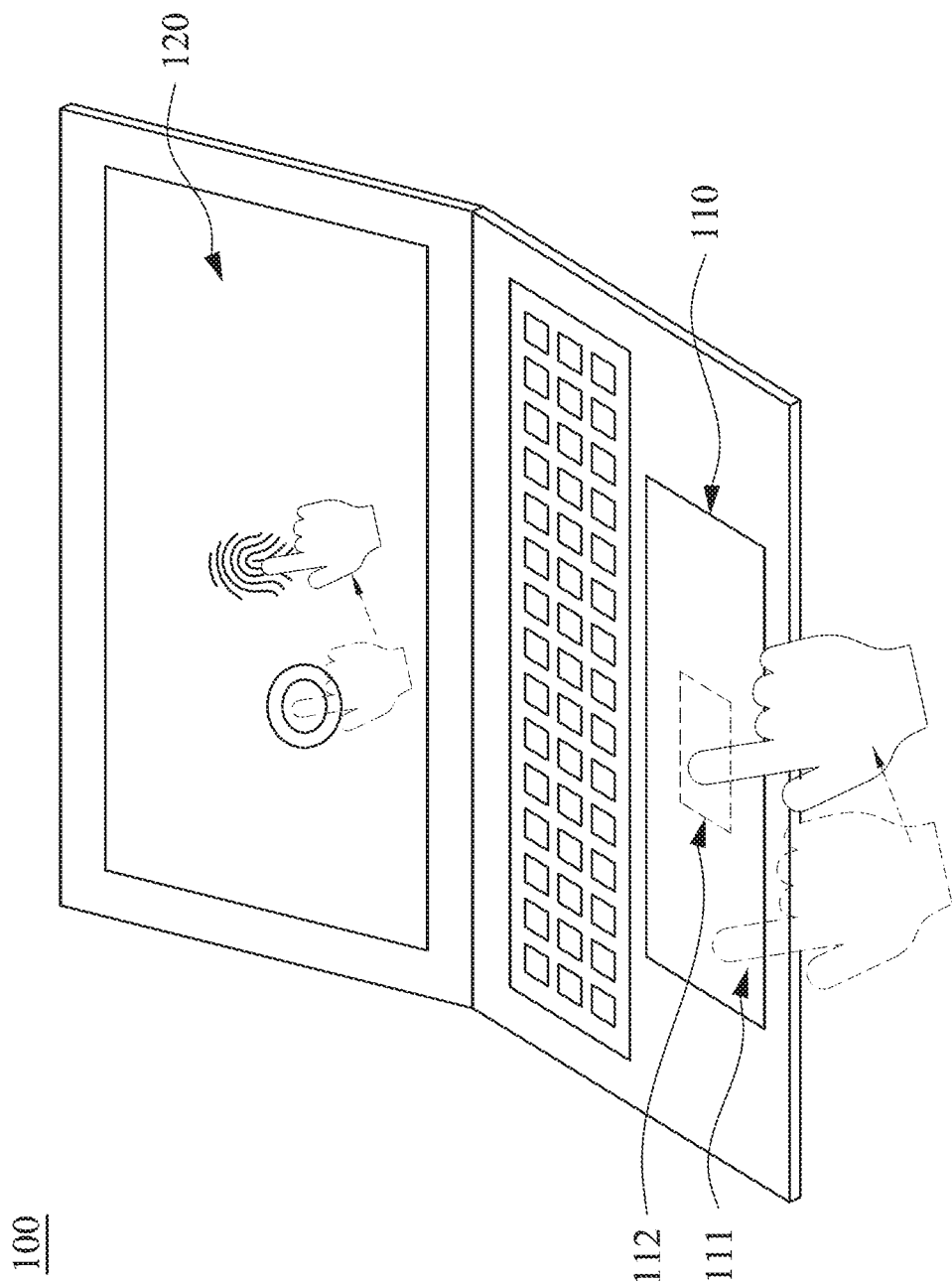
FIG. 4 illustrates a diagram shows that the display screen of the apparatus shows instruction to instruct the user to move a finger to the fingerprint area according to some embodiments of the present invention.

In step 1300, the display screen 120 of the apparatus 100 shows instruction to instruct the user to move a finger of the user from the touch area 111 to the fingerprint area 112. FIG. 4 illustrates a diagram shows that the display screen 120 of the apparatus 100 shows instruction to instruct the user to move a finger to the fingerprint area 112 according to some embodiments of the present invention. After the step 1300, the step 1200 is performed again to determine whether the touch position is within the fingerprint area 112.

In step 1400, the apparatus 100 is operated in the fingerprint sensing mode so as to recognize the fingerprint of a user, thereby determining authentication of the user. Then, in step 1500, the apparatus 100 determines whether authentication of the user is passed. When the authentication of the user is passed, the step 1600 is performed. When the authentication of the user is failed, the step 1400 is performed again to recognize the fingerprint of a user.

In step 1600, the apparatus 100 is operated in the touch sensing mode so as to recognize the touch event, such that the apparatus 100 performs cursor control by recognizing the touch event.

From the above description, the present invention provides an apparatus 100 integrated with fingerprint recognition and touch detection, and a method 1000 of controlling the apparatus 100. The touchpad 110 of the apparatus 100 of the present invention can both perform touch event recognition and fingerprint recognition, and therefore the apparatus 100 of the present invention does not require an addition separate fingerprint recognition device, thereby reducing cost and complexity of operating the apparatus, and such that the appearance of the apparatus of the present invention is simple and generous.

Although the present invention has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An apparatus integrated with fingerprint recognition and touch detection, comprising:
   a touchpad having a touch area for recognizing a touch event and a fingerprint area for recognizing a fingerprint and the touch event;
   a plurality of transmit (TX) lines of a first group and a plurality of TX lines of a second group;
   a plurality of receive (RX) lines of a first group and a plurality of RX lines of a second group, wherein each of the RX lines of the first group and each of the RX lines of the second group cross the TX lines of the first group and the TX lines of the second group; and
   a controller integrated circuit (IC) connected to each of the TX lines of the first group, the TX lines of the second group, the RX lines of the first group, and the RX lines of the second group;
   wherein each of the TX lines of the first group and the RX lines of the first group extends as a single line without interruption from the touch area; enters into, traverses, and exits the fingerprint area; and extends along another portion of the touch area;
   wherein when the apparatus is operated in a fingerprint sensing mode, the controller IC supplies a driving signal to all of the TX lines of the first group, and
   wherein when the apparatus is operated in a touch sensing mode, the controller IC supplies the driving signal to all of the TX lines of the second group and only a portion of the TX lines of the first group that are not all of the TX lines of the first group, and then the controller IC senses touch input based on a change in charges received from all of the RX lines of the second group and only a portion of the RX lines of the first group that are not all of the RX lines of the first group, thereby recognizing a touch position on the touchpad;
   wherein a density arrangement pattern and a pitch of the portion of the TX lines of the first group are identical to a density arrangement pattern and a pitch of the TX lines of the second group, said portion of the TX lines of the first group being that used when the apparatus is operated in the touch sensing mode.

2. The apparatus integrated with fingerprint recognition and touch detection of claim 1, wherein a distance between adjacent ones of the TX lines of the first group and a distance between adjacent ones of the RX lines of the first group are less than a distance between adjacent ones of the TX lines of the second group and a distance between adjacent ones of the RX lines of the second group.

3. The apparatus integrated with fingerprint recognition and touch detection of claim 1,
wherein a distance between adjacent ones of the first portion of the TX lines of the first group is the same as a distance between adjacent ones of the TX lines of the second group;
wherein a distance between adjacent ones of the first portion of the RX lines of the first group is the same as a distance between adjacent ones of the RX lines of the second group.

4. The apparatus integrated with fingerprint recognition and touch detection of claim 1,
wherein the apparatus is operated in the fingerprint sensing mode so as to recognize the fingerprint of a user, thereby determining authentication of the user;
when the authentication of the user is determined, the apparatus is operated in the touch sensing mode so as to recognize the touch event.

5. The apparatus integrated with fingerprint recognition and touch detection of claim 4, wherein prior to operating in the fingerprint sensing mode, the apparatus is operated in the touch sensing mode so as to recognize a touch position, of the user, on the touchpad.

6. The apparatus integrated with fingerprint recognition and touch detection of claim 5, further comprising:
a display screen;
wherein when the touch position is not within the fingerprint area, the display screen shows instruction to instruct the user to move a finger of the user to the fingerprint area.

7. A method of controlling an apparatus integrated with fingerprint recognition and touch detection, wherein the apparatus includes a touchpad having a touch area for recognizing a touch event and a fingerprint area for recognizing a fingerprint and the touch event, wherein the apparatus includes a plurality of transmit (TX) lines of a first group and a plurality of TX lines of a second group, wherein the apparatus includes a plurality of receive (RX) lines of a first group and a plurality of RX lines of a second group, wherein each of the RX lines of the first group and each of the RX lines of the second group cross the TX lines of the first group and the TX lines of the second group, where the method comprises:
supplying a driving signal to all of the TX lines of the first group in a fingerprint sensing mode; and
supplying the driving signal to all of the TX lines of the second group and only a portion of the TX lines of the first group that are not all of the TX lines of the first group in a touch sensing mode, and then sensing touch input based on a change in charges received from all of the RX lines of the second group and only a portion of the RX lines of the first group that are not all of the RX lines of the first group, thereby recognizing a touch position on the touchpad;
wherein each of the TX lines of the first group and the RX lines of the first group extends as a single line without interruption from the touch area; enters into, traverses, and exits the fingerprint area; and extends along another portion of the touch area;
wherein a density arrangement pattern and a pitch of the portion of the TX lines of the first group are identical to a density arrangement pattern and a pitch of the TX lines of the second group, said portion of the TX lines of the first group being that used when the apparatus is operated in the touch sensing mode.

8. The method of claim 7, wherein a distance between adjacent ones of the TX lines of the first group and a distance between adjacent ones of the RX lines of the first group are less than a distance between adjacent ones of the TX lines of the second group and a distance between adjacent ones of the RX lines of the second group.

9. The method of claim 7,
wherein a distance between adjacent ones of the first portion of the TX lines of the first group is the same as a distance between adjacent ones of the TX lines of the second group;
wherein a distance between adjacent ones of the first portion of the RX lines of the first group is the same as a distance between adjacent ones of the RX lines of the second group.

10. The method of claim 7, further comprising:
operating in the fingerprint sensing mode so as to recognize the fingerprint of an user, thereby determining authentication of the user; and
operating in the touch sensing mode so as to recognize the touch event when the authentication of the user is determined.

11. The method of claim 10, further comprising:
prior to operating in the fingerprint sensing mode, operating in the touch sensing mode so as to recognize a touch position, of the user, on the touchpad.

12. The method of claim 11, further comprising: instructing the user to move a finger of the user to the fingerprint area when the touch position is not within the fingerprint area.

* * * * *